A. L. PUTNAM.
VEHICLE WHEEL.
APPLICATION FILED NOV. 16, 1917. RENEWED APR. 30, 1919.
1,321,848. Patented Nov. 18, 1919.
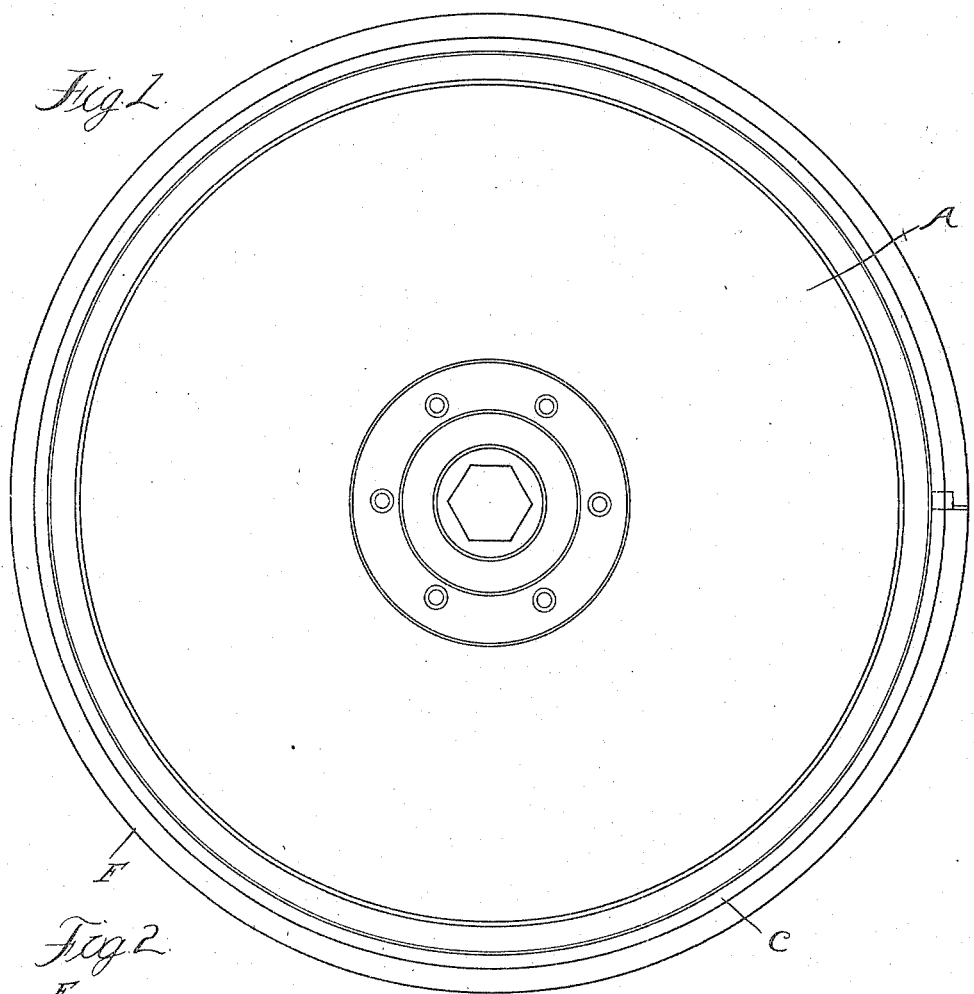
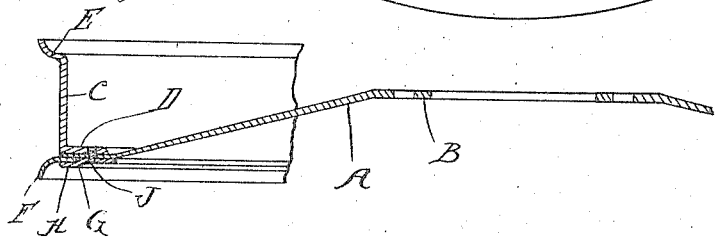
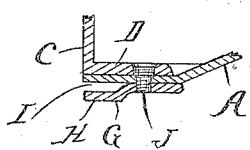
Inventor
Alden L. Putnam
By Whittemore Hulbert + Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

VEHICLE-WHEEL.

1,321,848.  Specification of Letters Patent.  Patented Nov. 18, 1919.

Application filed November 16, 1917, Serial No. 202,306. Renewed April 30, 1919. Serial No. 293,897.

*To all whom it may concern:*

Be it known that I, ALDEN L. PUTNAM, a citizen of the United States of America, residing at Detroit, in the county of Wayne and State of Michigan, have invented certain new and useful Improvements in Vehicle-Wheels, of which the following is a specification, reference being had therein to the accompanying drawings.

The invention relates to vehicle wheels of that type in which the body or center portion of the wheel is formed of a dished metallic disk peripherally attached to the rim or felly and detachably engaging the hub. The present invention has reference to the rim and means for attaching the same to the disk, including a detachable flange and means for securing the same as hereinafter set forth.

In the drawings:

Figure 1 is an elevation of the wheel;

Fig. 2 is a cross section therethrough;

Fig. 3 is a section showing a portion of Fig. 2 with the detachable flange disengaged.

A is a metallic disk which is dished so that the central portion B lies in a plane on one side of the central plane of the wheel while the periphery of the disk is in a plane on the opposite side of said central plane. The disk is also of tapering gage, the central portion being of greater thickness to provide requisite strength for attachment to the hub (not shown).

C is a rim section, which is provided with the inwardly extending flange D for attachment to the peripheral portion of the disk A, and an outwardly extending flange E at its free end for engagement with a demountable rim or tire. F is a detachable flange forming the opposite side of the rim and which is split so as to be capable of springing over the rim and into engagement with a groove therein. To form the groove for receiving the ring F a ring G is provided which is secured to the peripheral portion of the disk A opposite the flange D, and this ring is laterally offset at H to form the groove I, while the inner portion of the ring lies adjacent to the disk and is secured thereto by rivets or other means, indicated at J.

With the construction described the flange D and member G, which are securely attached to opposite sides of the peripheral portion of the disk, form a reinforcement therefor, through which stresses are carried from the rim into the disk. At the same time the offset in the member G provides a groove in which the split ring F may be engaged and securely fastened.

What I claim as my invention is:

1. In a vehicle wheel, the combination with a wheel body, of a felly rim at the periphery of said body provided on one side with an outwardly-extending fixed flange and having an inwardly-extending flange at its opposite side arranged adjacent to the wheel body, and a ring member secured opposite said flange and on the opposite side of the wheel body, offset to form a groove for receiving a detachable flange, said ring and flange forming a reinforcement for the peripheral portion of the wheel body.

2. In a vehicle wheel, the combination with a wheel body, of a felly rim having a fixed outwardly-extending flange at one side thereof, and an inwardly-extending flange at the opposite side arranged on one side of said wheel body, a flange on the opposite side of said wheel body secured to said inwardly-extending flange to clamp the wheel body therebetween and having its outer portion laterally deflected to form a groove, and a detachable tire-securing flange engaging said groove.

3. In a vehicle wheel, the combination with a wheel body, of a felly rim at the periphery of said wheel body, provided on one side with an outwardly-extending fixed tire-securing flange, and an inwardly-extending flange at its opposite side adjacent to said wheel body, a ring on the opposite side of said wheel body secured to said inwardly-extending flange and clamping the wheel body therebetween, the outer portion of said ring being laterally deflected to form a groove, and a detachable tire-securing flange or ring engaging said groove.

4. In a vehicle wheel, the combination with a wheel body, of a felly rim at the periphery of said wheel body, provided on one side with an outwardly-extending fixed tire-securing flange, and an inwardly extending flange at its opposite side adjacent to said wheel body, a ring on the opposite side of said wheel body secured to said inwardly-extending flange and clamping the disk therebetween, said ring having a groove-forming portion, and a detachable tire-securing flange engaging said groove.

In testimony whereof I affix my signature.

ALDEN L. PUTNAM.